US006483558B1

(12) United States Patent
Mitrowitsch

(10) Patent No.: US 6,483,558 B1
(45) Date of Patent: Nov. 19, 2002

(54) COLOR TELEVISION RECEIVER OR COLOR MONITOR HAVING A FLAT SCREEN

(75) Inventor: Johann Mitrowitsch, Lichtenwald (DE)

(73) Assignee: Matsushita Display Devices (Germany) GmbH, Esslingen (DE)

( * ) Notice: Subject to any disclaimer, the term of this patent is extended or adjusted under 35 U.S.C. 154(b) by 0 days.

(21) Appl. No.: 09/351,513

(22) Filed: Jul. 12, 1999

(30) Foreign Application Priority Data

Jul. 16, 1998 (EP) .......................................... 98113322

(51) Int. Cl.[7] .......................... H04N 3/26; G09G 1/28; H01J 29/51

(52) U.S. Cl. ............ 348/806; 315/368.28; 315/368.26; 315/371; 313/412

(58) Field of Search ................................ 348/805, 806, 348/807, 808, 810, 809; 315/368.15, 368.24, 368.25, 368.26, 368.27, 368.28, 366–371, 382, 368.18; 313/412, 413; H04N 3/26

(56) References Cited

U.S. PATENT DOCUMENTS 3,761,763 A * 9/1973 Saruta .................. 315/368.26
4,864,195 A * 9/1989 Masterton ............. 315/368.27
4,887,009 A * 12/1989 Bloom et al. ............... 313/414
5,248,920 A * 9/1993 Gioia et al. ............ 315/368.26
RE35,548 E * 7/1997 Sluyterman et al. ... 315/368.28

FOREIGN PATENT DOCUMENTS

| | | | |
|---|---|---|---|
| GB | 1449700 | * 9/1976 | ............ H01J/29/56 |
| GB | 2034108 | * 5/1980 | ............ H01J/29/51 |
| GB | 2261546 | * 5/1993 | ............ H01J/29/56 |
| WO | 92/02033 | 2/1992 | |
| WO | 9202033 | * 2/1992 | ............ H01J/29/56 |
| WO | 97/44808 | 11/1997 | ............ H01J/29/70 |

* cited by examiner

*Primary Examiner*—Michael H. Lee
(74) *Attorney, Agent, or Firm*—Darby & Darby

(57) ABSTRACT

Color television apparatus and color monitors are provided with a device, in particular with an electron lens system, to vary the mutual spacing of the electron beams generated in an electron beam generating system. By reducing the mutual spacing between the generated electron beams, in accordance with the deflection of the electron beams, the spacing of the shadow mask to the viewing screen can be increased at an increasing distance to the center of the screen, and thereby a less expensive shadow mask design can be used without having to take the former disadvantages of a flat screen into account.

19 Claims, 7 Drawing Sheets

COLOR TELEVISION RECEIVER OR COLOR MONITOR HAVING A FLAT SCREEN

The present invention relates to a color television receiver or a color monitor having a flat screen.

BACKGROUND OF THE INVENTION

Color television receivers and (computer) monitors serve for converting electric signals into color images. Television receivers as well as monitors nowadays usually have an interface for various video signal formats (such as composite signals, analog or digital component signals). These signals are converted in a television receiver or monitor into analog RGB signals for controlling a cathode ray tube. The video signals supplied to a television receiver or monitor are converted in such a manner that the video signal to be displayed includes luminance and chrominance values for each individual pixel of a display screen. To display an image contained in a video signal, three electron beams (one for each base color of the additive color mixture: red, green, blue) are generated in a color image display tube of a color television receiver or monitor, said electron beams being deflected towards the corresponding pixel on the viewing screen of the color display tube in accordance with the position of the pixel information in the video signal.

In a color display tube an additive color mixture is generated by a pixel-wise superposition of three chrominance component pictures. The viewing screen of such a color display tube consists of approximately 400,000 color triads; these are phosphor dots arranged in groups of three each composed of a red shining, green shining and blue shining phosphor dot. The diameter of such a phosphor dot is approximately 0.3 mm. Each of these dots is made to shine by one of the three electron beams, which are generated by the electron beam generating system in the neck of the color display tube. The deflection unit deflects the electron beams in a manner that they successively impinge on all pixels of the viewing screen. A shadow mask is arranged in the interior of the color display tube at a spacing of approximately 15 mm to the viewing screen, said shadow mask having a hole in exact allocation to each color triad. The holes having a diameter of approximately 0.25 mm are etched into the shadow mask at regular spacings. The three electron beams meet in the respective hole of the shadow mask controlled by the common beam deflection and impinge onto the phosphor dots of the viewing screen arranged behind said hole. A large part of the electrons generated by the electron beam generation system lands on the shadow mask. This leads to a heating-up and an expansion of the shadow mask, wherein in particular the holes located on the edge of the mask may be displaced in position with respect to the phosphor dots of the viewing screen. Such a displacement usually aggravates the color purity, since each of the three electron beams is allowed to impinge only onto the phosphor dot of the viewing screen associated to it.

Besides shadow masks which are provided as masks having holes, shadow mask in the form of strip masks are also used. In these strip masks the viewing screen of a color display tube is not provided with phosphor dots but with phosphor strips. Accordingly, the shadow mask comprises strip-like openings for the individual electron beams, which are each associated to the strips on the viewing screen.

To achieve that the chrominance component pictures appear congruent, the three electron beams must impinge onto the matching phosphor dots of a color triad across the entire surface of the viewing screen. Thus, the convergence of the three electron beams is adjusted in accordance with the position of its impingement point on the viewing screen of a display tube, i.e. in accordance with the deflection (so-called dynamic convergence).

The direct spacing between two adjacent phosphor dots of the same color is called dot pitch. In conventional color display tubes, the spacing between two phosphor dots or phosphor strips of the same color increases towards the edge. The resolution of a color display tube is defined by the size of the dot pitch. A variation of the dot pitch or mask pitch is an easy means to influence the curvature of the shadow mask in a desired manner. Since, however, a dot pitch that is too large is perceived by the viewer as an interfering stripe structure, a pixel resolution minimally to be kept must be obeyed when designing a shadow mask.

During the last years, color display tubes (color cathode ray tubes) were developed with screens becoming flatter and flatter. Accordingly, the radii of curvature or mask contours of the masks (shadow masks or masks having holes) also became flat. A development of flatter and flatter masks became possible by the use of invar as mask material and by coating the masks for temperature reduction during operation. A further increase of the flatness of the masks is, however, not possible in this way. Despite all effort it was not succeeded to realize screens with shaped shadow masks, which have a fully planar screen. The reason for this is the extremely small bulging of a shadow mask that is required for such a flat screen. The main problem of an extreme flat mask is the sensitivity over mechanical strain and its strong deformation in case of local heating during normal operation.

A known solution of this problem is to be seen in so-called tension masks. By means of these tension masks it is possible to use shadow masks for absolutely flat screens. The shape of these masks is defined in that they are mechanically pre-loaded either in the vertical direction only or simultaneously in the vertical and horizontal direction. This either leads to planar or cylindrical shapes. The mask remains dimensionally stable as long as the thermal expansion of the mask during operation does not compensate for the mechanical pre-load. The disadvantage of this solution is, however, that the generation of the high mechanical pre-loads requires very massive mask frame constructions. This increases the costs and the weight of a color television receiver or monitor.

For this reason, a use of conventionally shaped masks for television receivers and monitors having a flat screen would be desirable. If such an arrangement is used, the spacing between the mask and the viewing screen extremely increases at increasing distance to the center of the screen. Accordingly, the spacing of the individual phosphor dots of a color triad on the screen increases in the direction towards the edges of a screen, so that individual phosphor dots or strips in the margins become disturbingly visible to the viewer (in case of display tubes having an image side ratio of 16:9 in particular in the lateral rim portions).

OBJECT OF THE INVENTION

Thus, it is the object of the present invention to provide a color television receiver or a color monitor having an increased reproduction quality.

This object is solved by a television receiver or a color monitor comprising the features of claim 1.

According to the invention, a color television receiver or a color monitor includes a device, in particular an electron lens system, which may vary the mutual distance of the electron beams generated in an electron beam generating system. By reducing the mutual spacing between the generated electron beams, in accordance with the deflection of the electron beams, the spacing of the shadow mask to the viewing screen can be increased at an increasing distance to the center of the screen without having to take the known disadvantages into account.

Thereby for instance the shadow mask can be curved stronger than conventionally between the center of the screen and the rim of the screen also in case of a flat viewing screen. Thus, curved masks can be used for flatter or even absolutely planar screens, without special mask materials (e.g. invar) having to be used or without having to take a larger dot pitch, i.e. a coarser resolution in the marginal areas into consideration.

The mutual distance between the electron beams is preferably adjusted in accordance with the following formula:

$$s \approx Tri/3*(Ias-q)/q$$

This formula defines that the mutual spacing between the electron beams in the convergence plane depends proportional on the desired size of the triad dimensions Tri and on the ratio of the spacing between the convergence plane and the mask to the spacing between the mask and the viewing screen.

An electron lens system, which may effect a variable spacing of electron beams, is in the simplest case effected by a magnetic quadrupole, which is attached in the proximity of the deflection plane. By means of such a quadrupole, the two laterial beams of the electron beams generated by the electron beam system are influenced in accordance with the deflection by the deflection field of the deflection unit. Such a double magnetic quadrupole has the advantage that the desired variation of the spacings between the electron beams can be particularly easily achieved.

A further advantageous possible realization is the use of a double controllable electrostatic deflection element e.g. in the electron beam generation system. By means of a such a deflection element the spacings can also be influenced in an aimed manner.

An advantageous connection of the above-described advantages of magnetic or electrostatic elements is a combination of an electric and a magnetic quadrupole/deflection element. Such a solution is an advantageous compromise between an inexpensive realization by means of magnetic quadrupoles and the advantageous controllability by means of electrostatic deflection elements.

A further alternative form of realization is the integration of the quadrupole functions into the deflection unit, wherein the deflection unit deviates from the ideal dynamic convergence in an aimed manner and at the same time effecting a correction of this deviation by an electrostatic or magnetic quadrupole/deflection element. In this manner an inexpensive realization can be combined with an aimed influence on the variation of the spacing of the electron beams.

Especially favorable results can be achieved when the planes of the two quadrupoles used do not fall below a certain minimum spacing.

Moreover, better results can be achieved in that the effect of both quadrupoles used is compensated for with respect to the static and dynamic convergence.

DESCRIPTION OF DRAWINGS

Embodiments of the invention will be described with reference to the drawings:

The same picture elements are designated by the same reference numerals in all Figures.

FIG. 1 shows a conventional color display tube (color cathode ray tube). Color display tubes are nowadays predominantly used as three-beam color display tubes operating according to the shadow mask principle. In accordance with the arrangement of the three electron beam systems, a distinction is made between delta tubes and in-line tubes. In delta tubes the electron beam generating systems are located on the corners of an isosceles triangle. In in-line arrangements they are, however arranged successively on a horizontal plane. The standard display tubes for television purposes usually use the in-line arrangement, which has advantages regarding the convergence correction. In FIGS. 1 to 5, electron beams 6 to 8 are shown, which have the spacing s to one another.

FIG. 6 shows the basic design of a television receiver or monitor according to the invention. A video signal 40 having an image signal, which is to be displayed on the viewing screen 3 of the television receiver or monitor, is supplied to a video signal processing means 41. This video signal processing means 41 converts the input video signal 40 in a manner that the electron beam generating system 42 is supplied with the luminance and chrominance information of the three color signals (red, green, blue). At the same time, the corresponding horizontal and vertical synchronization pulses 44 are supplied to a deflection control 45. The vertical synchronization pulses synchronize the image change, the horizontal synchronization pulses ensure that the line scanning pattern of the image to be displayed is synchronized. This deflection control 45 controls the deflection of the electron beams generated by the electron beam generating system 42 in a manner that the electron beams are each deflected to the pixel of the viewing screen 3 for which at the same time the luminance and chrominance information is supplied by the video signal processing means 41 to the electron beam generating system 42. The deflection control 45 in other words takes care that the luminance and chrominance information of the video signal processing means 41 is associated to the correct pixel of the viewing screen 3 of the color display tube 43. For this purpose the deflection control signals 47 are supplied to the deflection unit 46. This deflection means changes the direction of the electron beams by an electric or magnetic field. In the majority of cathode ray tubes 43 the beam deflection is performed magnetically. The deflection unit 46 takes care for the field generation required for this purpose. This deflection unit usually has two partial coils for the horizontal deflection and two partial coils for the vertical deflection.

Figure 1:
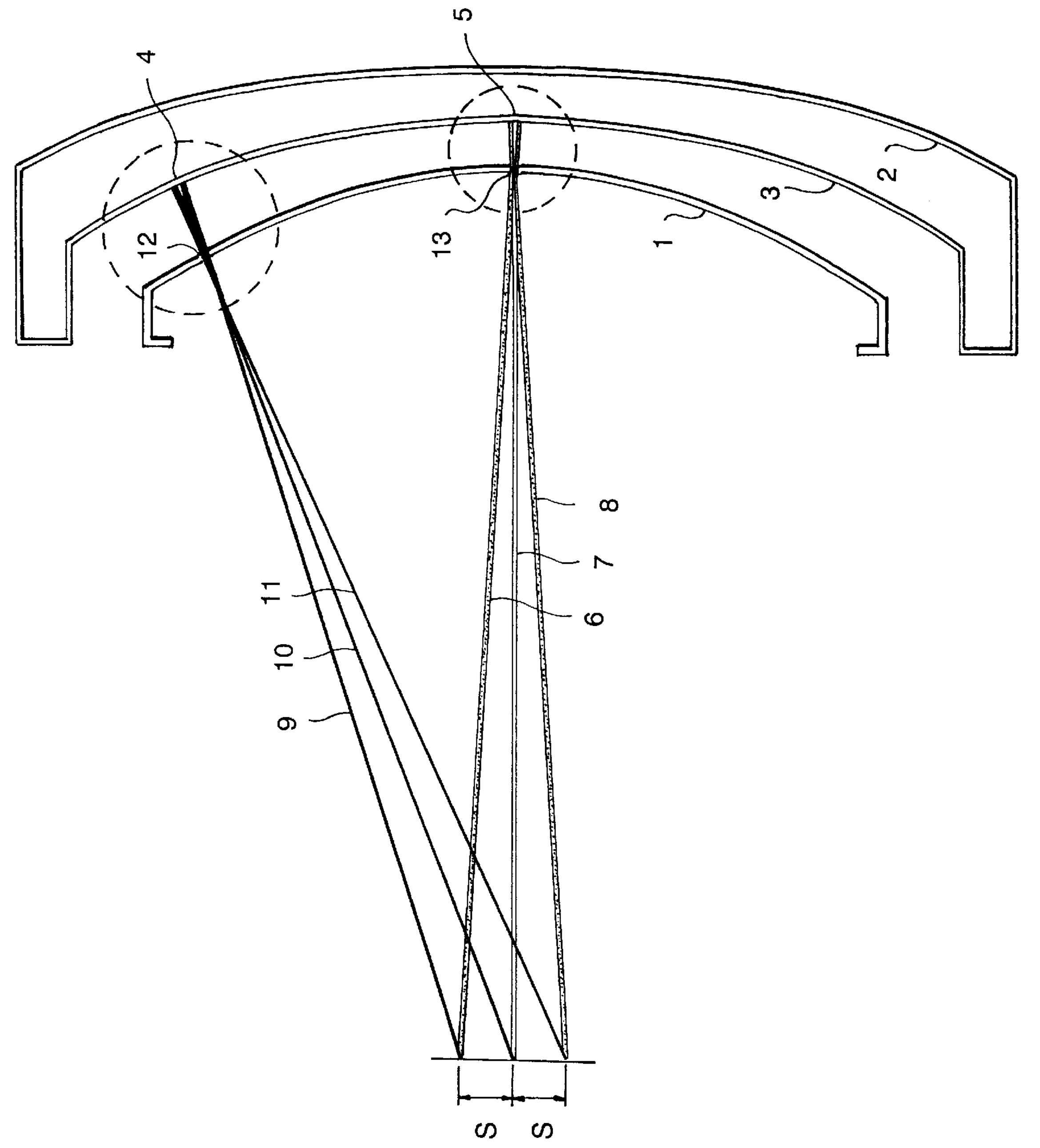
FIG. 1 shows a conventional color display tube.

The three deflected electron beams pass the shadow mask 1 and finally impinge onto the viewing screen 3 of the screen 2 of the color display tube 43. According to the invention the shadow mask 1 is bulged significantly stronger than the viewing screen 2. That means that despite of a flat screen 2 a conventionally curved shadow mask 1 can be used. In order not to have to take an enlarged dot pitch into consideration, the spacing of the three electron beams to one another is additionally changed in accordance with the deflection angle. Since the spacing between the shadow mask 1 and the viewing screen 3 is especially large particularly in the rim portions of the screen when using conventionally bulged shadow masks 1, the spacing of correspondingly deflected electron beams is diminished by the aid of an additional electron lens system 49. Thereby the dimension of color triads in the rim portions of the screen 2 is kept small so that a viewer does not notice a deteriorated picture resolution. The control of the spacing variation of the electron beams by the electron lens system 49 is performed via an electron lens system control 48 in accordance with the deflection (deflection signal 47) of the electron beams or the synchronization pulses 44.

Electron lens systems contain electron lenses, which represent electrostatic or/and magnetic fields the power thereof acting on moved electrons.

The adjustment of the spacing of the electron beams by the electron lens system 49, i.e. in particular the adjustment of the spacing of the red and blue rim beams to one another is performed in a manner de-coupled from the adjustment of the convergence of the electron beams, and irrespective of the influence of the angle of incidence of the laterial beams of the three electron beams on the screen plane. The lateral beams of the three electron beams in in-line electron beam generating systems are usually electron beams, which impinge onto the red and blue color pixels of the screen plane.

In FIGS. 1 to 4 the electron beams 6 to 8 generated by the electron beam generating system are shown with two different deflections each. Electron beams 6 to 8 that impinge onto the center of the screen 5 are shown bright. Electron beams 9 to 11 impinging onto a color triad 4 in the marginal area are, however, shown dark. The viewing screen 3 with the phosphor dots or phosphor strips is attached onto the inner side of the front screen glass body 2. The mask 1 having holes 12, 13 each associated to a color triad 4, 5 on the screen are arranged at a certain spacing to the phosphor layer 3. The frame by means of which the mask 1 is kept in place within the color display tube is not shown.

FIG. 1 shows a screen 2 and a shadow mask 1 both having a conventional curvature. In such a curved screen it is possible to manufacture the shadow mask in a conventional manner at low cost. A flat screen cannot be obtained in this manner by using conventional technology. The curvature of the shadow mask approximately corresponds to the curvature of the viewing screen 3 on the inner side of the screen 2. Because of this curvature of the viewing screen 3 the shadow mask may have a corresponding curvature so that the spacing of the shadow mask 1 to the viewing screen 3 only slightly increases from the center of the screen to the marginal areas. Thus, it is unproblematic to obtain a small dot pitch also in the marginal areas.

Figure 2:
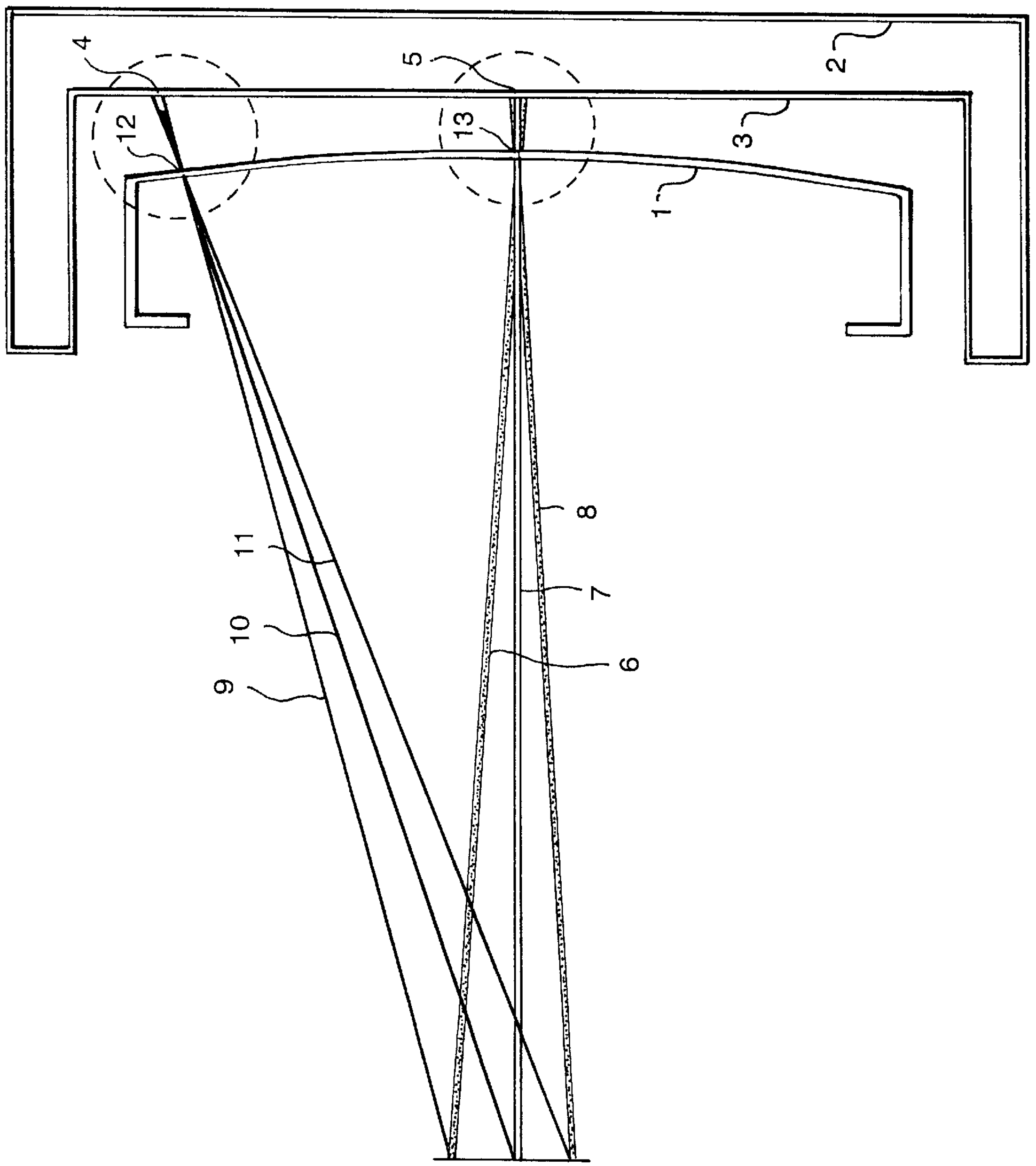
FIG. 2 shows a conventional flat color display tube.

FIG. 2 shows a conventional solution of realizing a flat screen 2. In this case the spacing between the viewing screen 3 and the shadow mask 1 must approximately remain constant so that the dot pitch 4, 5 in the marginal areas of the viewing screen 3 does not exceed a certain size. Thus, it is required that the shadow mask 1 has a severely smaller curvature than in FIG. 1. The manufacture of shadow mask 1 having such a small curvature leads to considerable technical problems, since extremely flat shadow masks 1 are extremely sensitive against mechanical strain and strongly deform during normal operation in case of local heating.

Figure 3:
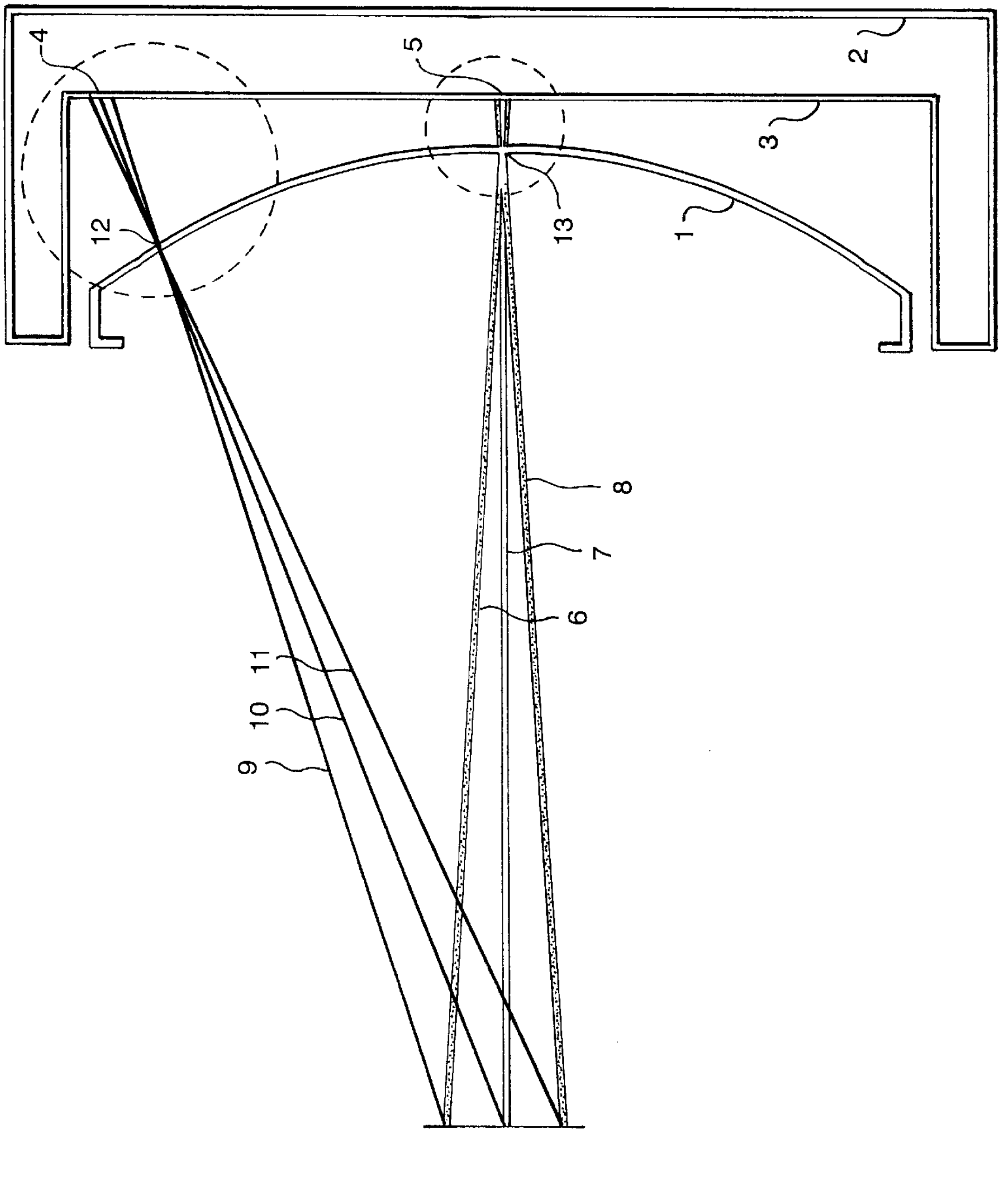
FIG. 3 shows a conventional flat color display tube having a maximally realizable mask curvature.

FIG. 3 shows a flat screen 2 with a conventionally curved mask 1. Although such an arrangement can be manufactured in a simple manner, it does, however, lead to a worse resolution in the marginal areas of the viewing screen 3. While in FIG. 2 the mask openings 12, 13 in the center of the picture and at the picture rim are located at approximately equal spacing to the viewing screen 3 and therefore generate small dot pitches 4, 5, the mask opening shown in FIG. 3 located farther inside the color display tube leads to a significantly increased dot pitch 4. Although such an arrangement would be inexpensive to manufacture, it is, however, not acceptable for the viewer because of the bad resolution in the marginal areas.

Figure 4:
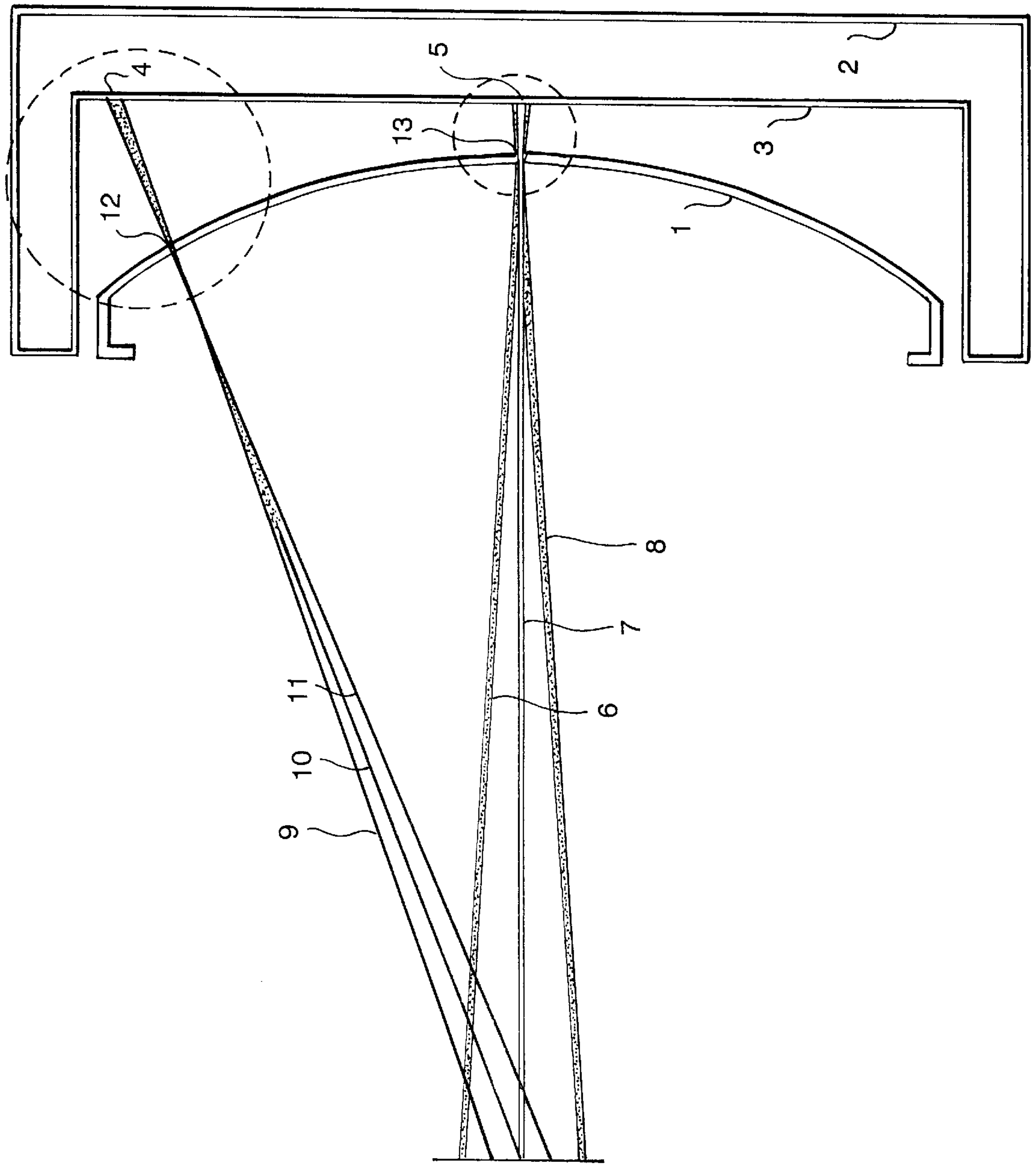
FIG. 4 shows a color display tube of a color television receiver or color monitor according to the invention having a variable spacing of electron beams.

In order to be able to use an arrangement with a curved mask and a flat screen, as shown in FIG. 3, additional measures are therefore required. FIG. 4 shows the structure of a color display tube in accordance with the invention. As in FIG. 3, a conventionally curved shadow mask I and a flat screen 2 are used according to the invention. In order to prevent that that the dot pitches 4 in the rim portions of the viewing screen 3 become inadmissibly large, the spacing of the electron beams 9 to 11 generated is diminished, when the electron beams 9 to 11 impinge on a color triad in the rim portion of the viewing screen 3. The spacing of the electron beams 6 to 8 does, however, remain constant when the electron beams impinge onto a color triad 5 in the center of the viewing screen 3. In this manner it is possible to provide a considerably greater spacing between the shadow mask 1 and the viewing screen in the rim portions than in the center of the screen. The advantage is in particular to be seen in that a shadow mask 1 inexpensive in manufacture can be used which at the same time is not sensible to mechanical strain and in case of local heating during normal operation does not extremely deform. Thereby the manufacturing costs of extremely flat and planar color display tubes are severely lowered.

For this purpose it is required that a color display tube according to the invention comprises an electron lens system in the proximity of the deflection unit of or the electron beam generating system. This electron lens system influences the spacing of the electron beams generated by the electron beam generating system in accordance with the respective angle of deflection or the respective point of incidence 4, 5 of the electron beams 9 to 11 onto the viewing screen 3.

The variation of the mutual spacing of the electron beams is performed without any influence on the convergence of the beams in the plane of the screen.

Figure 5:
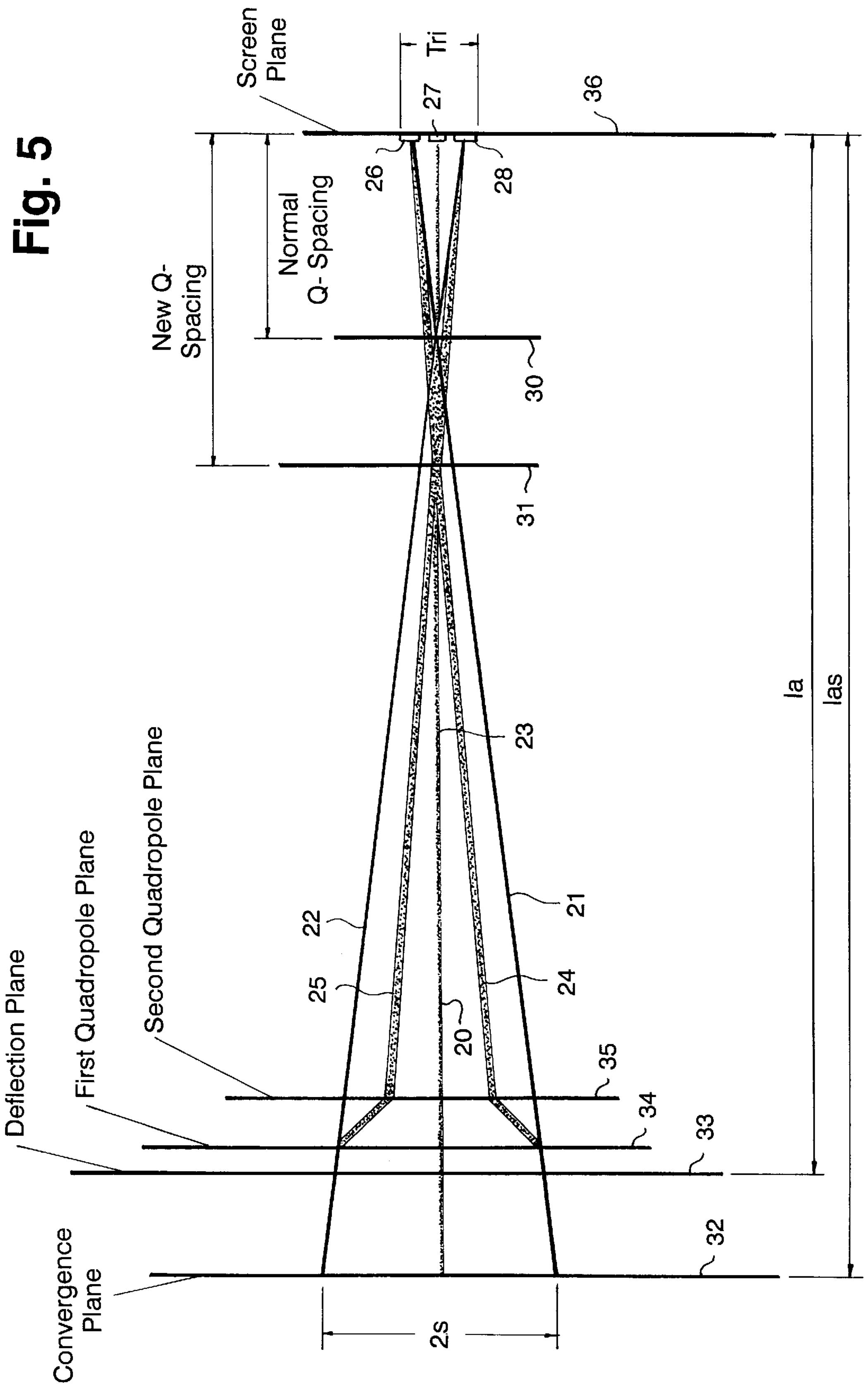
FIG. 5 shows the geometric relations of the electron beams of a color display tube according to FIG. 4.
Figure 6:
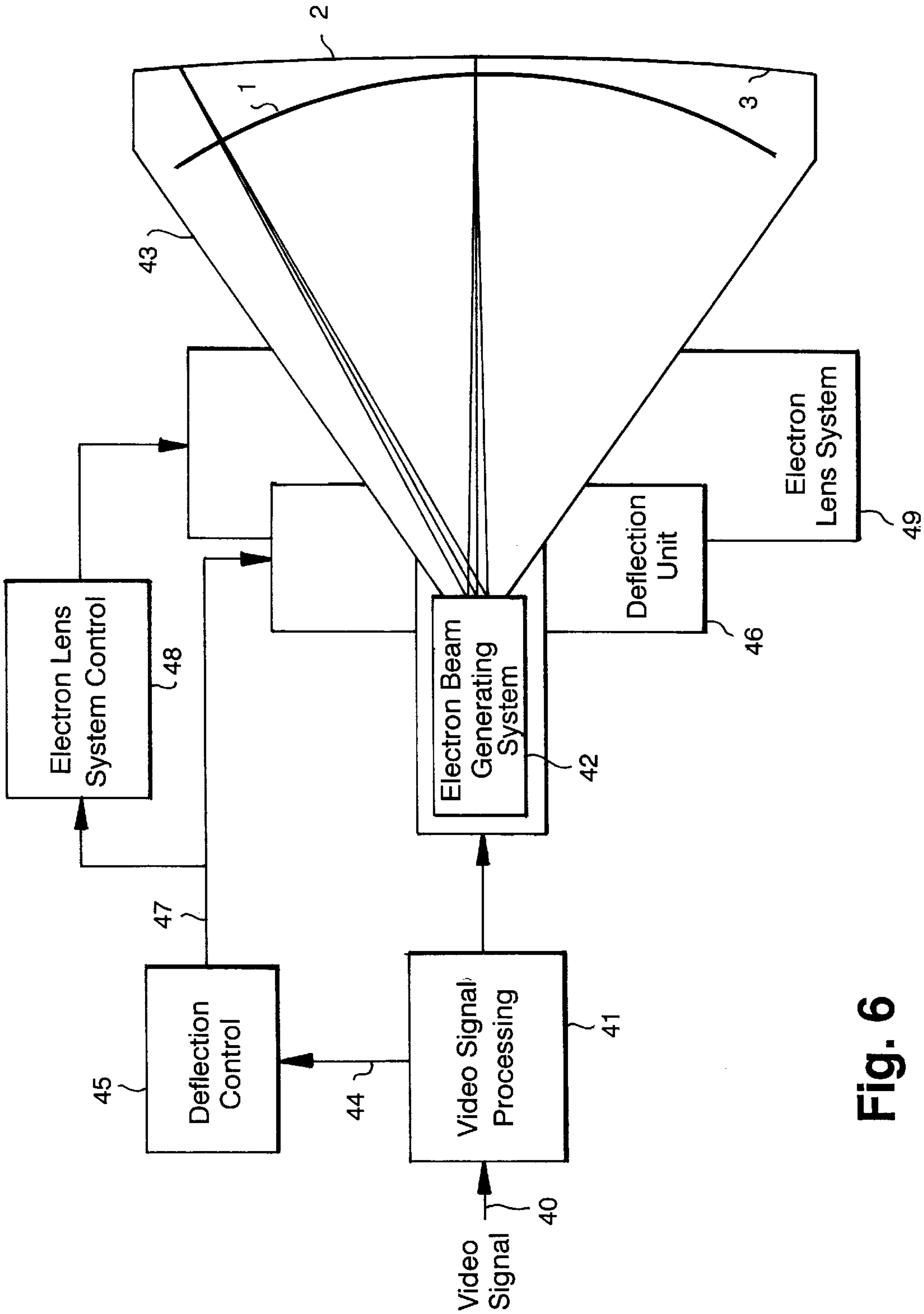
FIG. 6 shows a block diagram of a color television receiver or monitor.

FIG. 5 shows the geometric relations with and without the use of an electron lens system. The electron beams 20 to 22 are generated in an electron beam generating system that is not shown and comprise the spacing s to one another in the convergence plane 32. Without deflection, the electron beams impinge as pixel triad 26 to 28 onto the screen 3 in the screen plane 36. The mask has a normal Q-spacing 30 to the screen plane 36. The size of the triad dimensions Tri be derived as follows:

$$Tri = 3 \cdot s \cdot \frac{q}{las - q}$$

wherein in this formula

Tan defines the triad dimensions,.

s defines the spacing of the electron beams in the convergence plane 32, q defines the spacing of the shadow mask 1 to the viewing screen 3 (Q-spacing 30, 31), Ias defines the spacing of the convergence plane 32 to the viewing screen 3 (screen plane 36).

It can be derived from these geometric relations that the triad dimensions Tri vary directly proportional to the spacing s of the electron beams 20 to 22. That means by reducing the mutual spacing s of the electron beams 20 to 22 the dimensions Tri of a color triad can be reduced accordingly.

The best imaging properties, in particular color purity, are achieved when the triad dimensions Tri correspond to the horizontal dot pitch (spacing of equal color strips or phosphor dots). The size of the horizontal dot pitch Ps of a color display tube can be derived from the following formula:

$$Ps = \frac{Pm \cdot Ia}{Ia - q}$$

wherein

Ps defines the horizontal dot pitch

Pm defines the horizontal mask pitch (slot spacing or hole spacing),

Ia defines the spacing of the deflection plane 33 to the viewing screen 3 (screen plane 36), q defines the spacing of the shadow mask 1 to the viewing screen 3 (Q-spacing 30, 31).

Dimensions for an embodiment are shown in table 1

TABLE 1

Comparison of a 29" super-flat invar tube 3.5 R according to a conventional design to a display tube having a flat screen and a design according to the invention.

| | Conventional color display tube | flat color display tube according to the present invention |
|---|---|---|
| la | 278 mm | 278 mm |
| las | 345 mm | 345 mm |
| s | 5.5 mm | |
| sm | | 5.5 mm |
| se | | 2.8 mm |
| Qm | 15 mm | 15 mm |
| Qe | 18 mm | 31 mm |
| Trim | 0.80 mm | 0.80 mm |
| Trie | 0.98 mm | 1.04 mm |
| Pm | 0.75 mm | 0.75 mm |
| Pe | 0.87 mm | 0.87 mm |

Wherein:

Ia defines the spacing of the deflection plane 33 to the screen plane 36, Ias defines the spacing of the convergence plane 32 to the screen plane 36, s defines the spacing of the electron beams in the convergence plane 32, sm defines the spacing of the electron beams for the screen center, se defines the spacing of the electron beams for a corner of the screen, qm defines the spacing of the mask plane 30 to the screen plane 36 in the center of the screen, Qe defines the spacing of the mask plane 31 to the screen plane 36 in a screen corner Trim defines triad dimensions in the center of the screen, Trie defines triad dimensions in the corner of the screen, Pm defines the dot pitch in the center of the screen, Pe defines the dot pitch in a corner of the screen.

Figure 7:
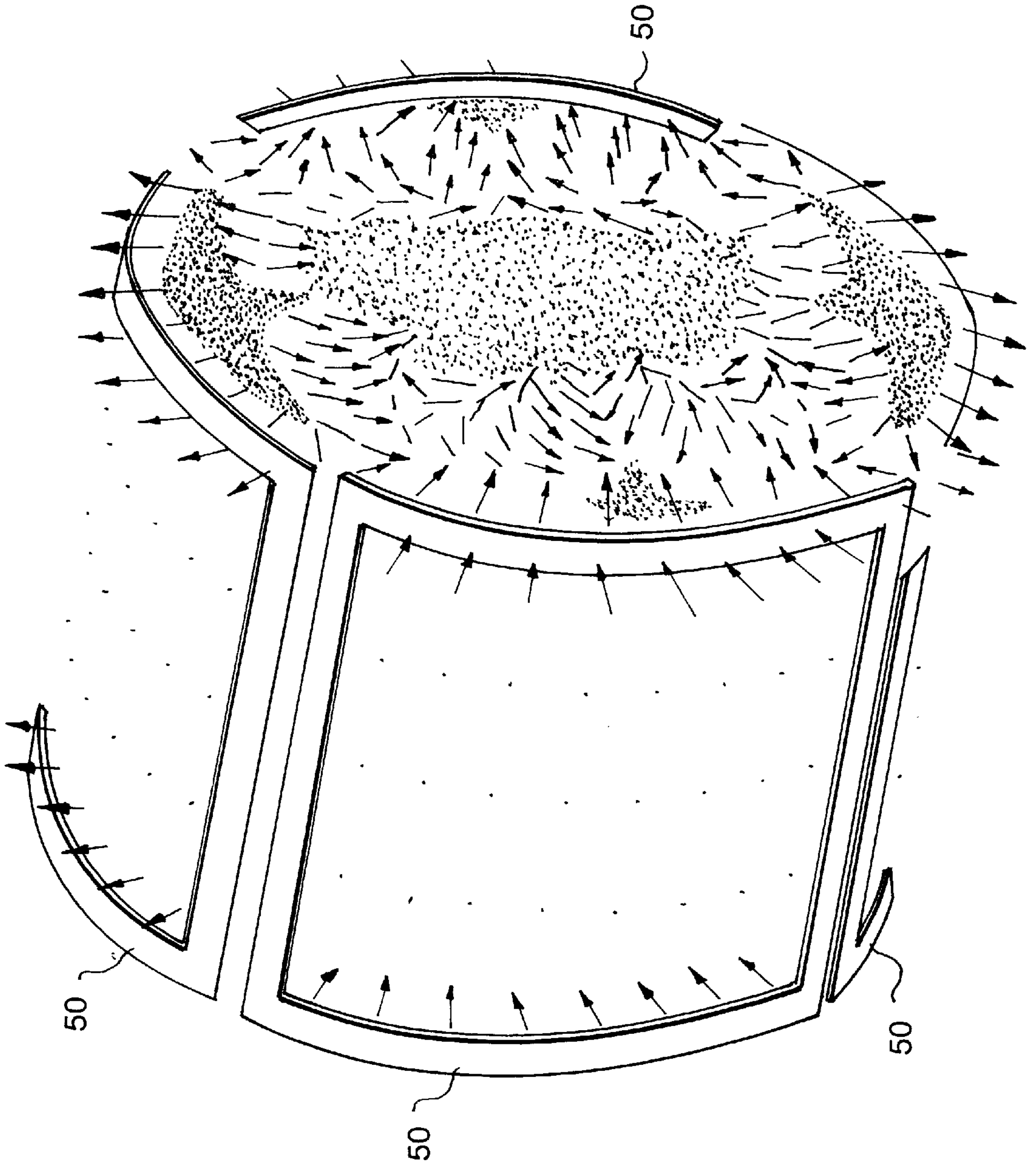
FIG. 7 shows the structure of a magnetic quadrupole field.

According to the invention, quadrupoles are used for controlling the spacing of the electron beams. FIG. 7 shows the structure of a magnetic quadrupole having four field generating means (coils) 50. The electron beams move longitudinally through the cylindrical space shown in FIG. 7, which is encompassed by the field generating means 50. Each of the neighboring field generating means 50 generates an opposite magnetic field. The field strength is shown in FIG. 7 by arrows. The farther the electron beams are remote from the central axis of the cylinder when moving through the cylinder, the more they are either moved towards the inside to the central axis or towards the outside away from the central axis. The quadrupoles connected in series, in which the electron beams move in the rim portions successively through a focused and a defocused portion (or in the opposite sequence), the spacing of the electron beams to one another can be varied. Such magnetic quadrupoles encompass the tube neck and therefore the electron beam generating system from the outside. Electrostatic electro-optical lenses are, on the other hand, an integrated component of the electron beam generating system.

I claim:

1. A color television receiver or a color monitor, comprising a color ray tube having an electron beam generating system for generating a plurality of electron beams for reproducing a video signal, wherein the electron beams have a predetermined mutual spacing to one another, a shadow mask, and a substantially flat viewing screen, a deflection unit for a common deflection of the electron beams of the electron beam generating system in a horizontal and vertical direction, a deflection control for controlling the deflection unit in accordance with synchronization pulses of the video signal, an electron lens system provided in one of the areas of the deflection unit and the area of the electron beam generating system of the cathode ray tube for varying the mutual spacing of the electron beams, and an electron lens system control for controlling the variation of the mutual spacing of the electron beams caused by the electron lens system in accordance with either the control signals of the deflection control or the synchronization pulses of the video signal, wherein said electron lens system control sets the mutual spacing between the electron beams essentially proportional on the ratio of the spacing between the convergence and the shadow mask to the spacing between the shadow mask and the viewing screen.

2. A color television receiver or color monitor comprising:

a cathode ray tube having an electron beam generating system for generating a plurality of electron beams for reproducing a video signal, wherein the electron beams have a predetermined mutual spacing to one another, a shadow mask, and a viewing screen, a deflection unit for a common deflection of the electron beams of the electron beam generating system in a horizontal and vertical direction, and a deflection control for controlling the deflection unit in accordance with synchronization pulses of the video signal, an electron lens system provided in one of the area of the deflection unit and the area of the electron beam generating system of the cathode ray tube for varying the mutual spacing of the electron beams, and an electron lens system control for controlling the variation of the mutual spacing of the electron beams caused by the electron lens system in accordance with either the control signals of the deflection control or the synchronization pulses of the video signal to adjust the mutual spacing of the electron beams according to the following formula $$s \approx Tri/3^{*}(Ias-q)/q$$

wherein s—defines the mutual spacing of the electron beams,

Tri—defines the triad dimensions,

Ias—defines the spacing of the convergence plane to the viewing screen, and q—defines the spacing of the shadow mask to the viewing screen.

3. A color television receiver or color monitor as claimed in claim 1, wherein the electron lens system is realized by a double magnetic quadrupole which is arranged in the proximity of a deflection plane of the deflection unit.

4. A color television receiver or color monitor as claimed in claim 3, wherein the double magnetic quadrupole influences the laterial beams of the electron beams generated by the electron beam generating system by an effect synchronous to the deflection field of the deflection unit.

5. A color television receiver or color monitor as claimed in claim 1, wherein the electron lens system is realized by a controllable electrostatic double deflection element.

6. A color television receiver or color monitor as claimed in claim 1, wherein the electron lens system is realized by a combination of an electrostatic deflection element and a magnetic quadrupole.

7. A color television receiver or color monitor as claimed in claim 1, wherein the electron lens system is realized by integrating a quadrupole function into the deflection unit.

8. A color television receiver or color monitor as claimed in claim 7, wherein the integration of the quadrupole function into the deflection unit is achieved by an aimed deviation from the ideal dynamic convergence and a simultaneous correction of this deviation by an electrostatic deflection element or a magnetic quadrupole in a different plane.

9. A color television receiver or color monitor as claimed in claim 3, wherein a first quadrupole plane and a second quadrupole plane have a predetermined minimum spacing to each other.

10. A color television receiver or color monitor as claimed in claim 3, wherein the effect of the two quadrupoles is compensated for with respect to the static and dynamic convergence.

11. A color television receiver or color monitor as claimed in claim 1, wherein the spacing between the shadow mask and the viewing screen becomes larger with an increased distance to the center of the viewing screen.

12. A color television receiver or color monitor as claimed in claim 11, wherein the electron lens system control adjusts the mutual spacing of the electron beams according to the following formula $$s \approx Tri/3^{*}(Ias-q)/q$$

wherein s—defines the mutual spacing of the electron beams,

Tri—defines the triad dimensions,

Ias—defines the spacing of the convergence plane to the viewing screen, and q—defines the spacing of the shadow mask to the viewing screen.

13. A color television receiver or color monitor as claimed in claim 12, wherein the electron lens system is realized by a double magnetic quadrupole which is arranged in the proximity of a deflection plane of the deflection unit.

14. A color television receiver or color monitor as claimed in claim 13, wherein the double magnetic quadrupole influences the rim beams of the electron beams generated by the electron beam generating system by an effect synchronous to the deflection field of the deflection unit.

15. A color television receiver or color monitor as claimed in claim 14, wherein a first quadrupole plane and a second quadrupole plane have a predetermined minimum spacing to each other.

16. A color television receiver or color monitor as claimed in claim 12, wherein the electron lens system is realized by integrating a quadrupole function into the deflection unit.

17. A color television receiver or color monitor as claimed in claim 16, wherein the integration of the quadrupole function into the deflection unit is achieved by an aimed deviation from the ideal dynamic convergence and a simultaneous correction of this deviation by an electrostatic deflection element or a magnetic quadrupole in a different plane.

18. A color television receiver or color monitor as claimed in claim 17, wherein the first quadrupole plane and the second quadrupole plane have a predetermined minimum spacing to each other.

19. A color television receiver or monitor as claimed in claim 11 wherein said electron lens system control sets the mutual spacing between the electron beams essentially proportional on the ratio of the spacing between the convergence and the shadow mask to the spacing between the shadow mask and the viewing screen.

* * * * *